(12) United States Patent
Filippov et al.

(10) Patent No.: US 12,341,991 B2
(45) Date of Patent: *Jun. 24, 2025

(54) METHOD AND APPARATUS FOR DC INTRA PREDICTION OF RECTANGULAR BLOCKS USING AN ASPECT RATIO

(71) Applicant: HUAWEI TECHNOLOGIES CO., LTD., Guangdong (CN)

(72) Inventors: Alexey Konstantinovich Filippov, Moscow (RU); Vasily Alexeevich Rufitskiy, Moscow (RU); Jianle Chen, San Diego, CA (US)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 151 days.

This patent is subject to a terminal disclaimer.

(21) Appl. No.: 18/146,299

(22) Filed: Dec. 23, 2022

(65) Prior Publication Data

US 2023/0128206 A1 Apr. 27, 2023

Related U.S. Application Data

(63) Continuation of application No. 17/121,773, filed on Dec. 15, 2020, now Pat. No. 11,546,631, which is a
(Continued)

(51) Int. Cl.
*H04N 19/593* (2014.01)
*H04N 19/119* (2014.01)
(Continued)

(52) U.S. Cl.
CPC ......... *H04N 19/593* (2014.11); *H04N 19/119* (2014.11); *H04N 19/159* (2014.11);
(Continued)

(58) Field of Classification Search
None
See application file for complete search history.

(56) References Cited

U.S. PATENT DOCUMENTS 11,223,844 B2 1/2022 Abe et al.
2004/0233993 A1 11/2004 Johansen et al.
(Continued)

FOREIGN PATENT DOCUMENTS

AU 2016269520 A1 1/2017
CN 101069429 A 11/2007
(Continued)

OTHER PUBLICATIONS

Yongbing Lin et al., "Modification to DC prediction in SDIP", JCTVC-F584, total:3pages.
(Continued)

*Primary Examiner* — Md N Haque

(57) ABSTRACT

A method for intra prediction of a current block of a picture is provided. The method includes obtaining an aspect ratio of the current block according to a width and a height of the current block; obtaining a weighting factor based on the aspect ratio, and determining an intra-prediction value of the current block based on the weighting factor. Intra-prediction value of a current block may be obtained with high accuracy or low computational complexity, so as to improve coding efficiency.

17 Claims, 9 Drawing Sheets

Related U.S. Application Data continuation of application No. PCT/RU2019/050084, filed on Jun. 13, 2019.

(60) Provisional application No. 62/792,363, filed on Jan. 14, 2019, provisional application No. 62/685,297, filed on Jun. 15, 2018.

(51) Int. Cl.
*H04N 19/159* (2014.01)
*H04N 19/172* (2014.01)
*H04N 19/176* (2014.01)
*H04N 19/182* (2014.01)
*H04N 19/61* (2014.01)

(52) U.S. Cl.
CPC ......... *H04N 19/172* (2014.11); *H04N 19/176* (2014.11); *H04N 19/182* (2014.11); *H04N 19/61* (2014.11)

(56) References Cited

U.S. PATENT DOCUMENTS

| | | | |
|---|---|---|---|
| 2014/0286412 A1 | 9/2014 | Joshi et al. | |
| 2015/0271523 A1 | 9/2015 | Sung et al. | |
| 2015/0334411 A1* | 11/2015 | Yamamoto | H04N 19/513 375/240.16 |
| 2017/0272748 A1 | 9/2017 | Seregin et al. | |
| 2019/0379914 A1* | 12/2019 | Misra | H04N 19/186 |
| 2020/0021805 A1* | 1/2020 | Ko | H04N 19/159 |
| 2020/0099925 A1 | 3/2020 | Lee | |
| 2020/0099935 A1 | 3/2020 | Lee | |
| 2020/0221102 A1 | 7/2020 | Yu et al. | |
| 2021/0021809 A1 | 1/2021 | Kim | |
| 2021/0235095 A1* | 7/2021 | Choi | H04N 19/176 |
| 2021/0274175 A1* | 9/2021 | Lim | H04N 19/176 |
| 2022/0046235 A1 | 2/2022 | Lee | |
| 2023/0171413 A1* | 6/2023 | Sharman | H04N 19/593 375/240.12 |
| 2024/0137654 A1* | 4/2024 | Kim | H04N 13/161 |

FOREIGN PATENT DOCUMENTS

| | | |
|---|---|---|
| CN | 102857764 A | 1/2013 |
| CN | 112534823 A | 3/2021 |
| JP | 2007502595 A | 2/2007 |
| JP | 2015181254 A | 10/2015 |
| KR | 20180000303 A | 1/2018 |
| WO | 2012058394 A1 | 5/2012 |
| WO | 2019050292 A1 | 3/2019 |

OTHER PUBLICATIONS

Han Huang et al., "EE2.1: Quadtree plus binary tree structure integration with JEM tools", Joint Video Exploration Team (JVET) of ITU-T SG 16 WP 3 and ISO/IEC JTC 1/SC 29/WG 11, Document: JVET-C0024, 3rd Meeting: Geneva, CH, May26-Jun. 1, 2016, total 18 pages.

Jianle Chen et al., "JVET AHG report: JEM algorithm description editing (AHG2)", Joint Video Exploration Team (JVET) Joint Video Exploration Team (JVET), Document: JVET-D0002, 4th Meeting: Chengdu, CN, 15 Oct. 21, 2016, total 3 pages.

Moonmo Koo et al., "Description of SDR video coding technology proposal by LG Electronics", Joint Video Experts Team (JVET) of ITU-T SG 16 WP 3 and ISO/IEC JTC 1/SC 29/WG 11, Document: JVET-J0017-v1, 10th Meeting: San Diego, CA, 10 Apr. 20, 2018, total 97 pages.

Tadamasa Toma et al.,"Description of SDR video coding technology proposal by Panasonic", Joint Video Experts Team (JVET) of ITU-T SG 16 WP 3 and ISO/IEC JTC 1/SC 29/WG 11, Document: JVET-J0020-v1, 10th Meeting: San Diego, US, 10 Apr. 20, 2018, total 132 pages.

Sri Nitchith Akula et al., "Description of SDR, HDR and 360 video coding technology proposal considering mobile application scenario by Samsung, Huawei, GoPro, and HiSilicon", buJoint Video Exploration Team (JVET) of ITU-T SG 16 WP 3 and ISO/IEC JTC 1/SC 29/WG 11, Document: JVET-J0024_v2, 10th Meeting: San Diego, US, 10 Apr. 20, 2018, total 204 pages.

Geert Van der Auwera et al., "Description of Core Experiment 3: Intra Prediction and Mode Coding", Joint Video Experts Team (JVET) of ITU-T SG 16 WP 3 and ISO/IEC JTC 1/SC 29/WG 11, Document: JVET-J1023_r1, 10th Meeting: San Diego, USA, 10 Apr. 20, 2018, total 51 pages.

Recommendation ITU-T H.264"Advanced video coding for generic audiovisual services", Apr. 2017, total 812 pages.

Recommendation ITU-T H.265"High efficiency video coding", Feb. 2018, total 692 pages.

Implementors Guide for H.263: Video coding for low bit rate communication Aug. 5, 2005, total 10 pages.

Jani Lainema et al., "SCE1: Results of test 1.1 on intra DC correction", JCTVC-M0031, version 1,date Apr. 2, 2013, total 4 pages.

Gary Sullivan et al., Meeting report of the 13th meeting of the Joint Collaborative Team on Video Coding (JCT-VC), Incheon, KR, Apr. 18-26, 2013, Joint Collaborative Team on Video Coding (JCT-VC)of ITU-T SG16 WP3 and ISO/IEC JTC1/SC29/WG1113th Meeting: Incheon, KR, Apr. 18-26, 2013 , Document: JCTVC-M_Notes_d54, 130 pages.

* cited by examiner

METHOD AND APPARATUS FOR DC INTRA PREDICTION OF RECTANGULAR BLOCKS USING AN ASPECT RATIO

CROSS-REFERENCE TO RELATED APPLICATIONS

This application is a continuation of U.S. patent application Ser. No. 17/121,773, filed on Dec. 15, 2020, which is a continuation of International Application No. PCT/RU2019/050084, filed on Jun. 13, 2019, which claims priority to U.S. Provisional Application No. 62/685,297, filed on Jun. 15, 2018, and U.S. Provisional Application No. 62/792,363, filed on Jan. 14, 2019. All of the afore-mentioned patent applications are hereby incorporated by reference in their entireties.

The present disclosure relates to the technical field of image and/or video coding and decoding, and in particular to method and apparatus for intra prediction.

BACKGROUND

Digital video has been widely used since the introduction of DVD-discs. Before transmission the video is encoded and transmitted using a transmission medium. The viewer receives the video and uses a viewing device to decode and display the video. Over the years the quality of video has improved, for example, because of higher resolutions, color depths and frame rates. This has lead into larger data streams that are nowadays commonly transported over the Internet and mobile communication networks.

Higher resolution videos, however, typically require more bandwidth as they have more information. In order to reduce bandwidth requirements video coding standards involving compression of the video have been introduced. When the video is encoded the bandwidth requirements (or corresponding memory requirements in case of storage) are reduced. Often this reduction comes at the cost of quality. Thus, the video coding standards try to find a balance between bandwidth requirements and quality.

The High Efficiency Video Coding (HEVC) is an example of a video coding standard that is commonly known to persons skilled in the art. In HEVC, to split a coding unit (CU) into prediction units (PU) or transform units (TUs). The Versatile Video Coding (VVC) next generation standard is the most recent joint video project of the ITU-T Video Coding Experts Group (VCEG) and the ISO/IEC Moving Picture Experts Group (MPEG) standardization organizations, working together in a partnership known as the Joint Video Exploration Team (JVET). VVC is also referred to as ITU-T H.266/Next Generation Video Coding (NGVC) standard. In VVC, it removes the concepts of multiple partition types, i.e. it removes the separation of the CU, PU and TU concepts except as needed for CUs that have a size too large for the maximum transform length, and supports more flexibility for CU partition shapes.

Processing of these coding units (CUs) (also referred to as blocks) depends on their size, spatial position and a coding mode specified by an encoder. Coding modes can be classified into two groups according to the type of prediction: intra- and inter-prediction modes. Intra prediction modes use samples of the same picture (also referred to as frame or image) to generate reference samples to calculate the prediction values for the samples of the block being reconstructed. Intra prediction is also referred to as spatial prediction. Inter-prediction modes are designed for temporal prediction and use reference samples of previous or next pictures to predict samples of the block of the current picture.

For a rectangular block, an average value of adjacent pixels at a given intra-prediction mode is less accurate or much complicated, which leads to lower coding efficiency.

SUMMARY

Apparatus and method for intra prediction are disclosed to obtain intra-prediction value of a current block with high accuracy or less complicated, so as to improve coding efficiency.

A first aspect of the embodiments of the present application discloses a method for intra prediction of a current block implemented in an encoder or a decoder. The method includes obtaining a width and a height of the current block, and comparing the width with the height. The method further includes determining a DC value of the current block based on the longer one of the width and the height. For example, when the width is greater than the height, a DC value of the current block is determined based on the width. When the height is greater than the width, a DC value of the current block is determined based on the height. This allows to keep the design of DC mode determination computationally simple.

Optionally, an implementation of the first aspect provides, when the width is greater than the height, the DC value is calculated by:

$$DC = \left(\left(\sum_{i=0}^{W-1} p_i\right) + (W \gg 1)\right) \gg w,$$

$$w = \log_2(W),$$

wherein DC denotes the DC value, W denotes the width of the current block, and $P_i$ denotes a reference sample of the current block.

Optionally, another implementation of the first aspect provides, when the height is greater than the width, the DC value is calculated by:

$$DC = \left(\left(\sum_{i=0}^{H-1} p_i\right) + (H \gg 1)\right) \gg h,$$

$$h = \log_2(H),$$

wherein DC denotes the DC value, H denotes the height of the current block, and $P_i$ denotes a reference sample of the current block.

A second aspect of the embodiments of the present application discloses a method for intra prediction of a current block implemented in an encoder or a decoder. The method includes obtaining a width and a height of the current block. The method further includes determining a DC value of the current block based on the width when the width is greater than a product of the height and a first threshold value. The method further includes determining a DC value of the current block based on the height when the height is greater than a product of the width and a second threshold value. This allows to keep the design of DC mode determination computationally simple.

Optionally, an implementation of the second aspect provides, that the first threshold value may be the same as the second threshold value. For example, the first threshold value may equal to 1.

Optionally, in the second aspect, another implementation of the aspect provides, when $W > f_{THR} \cdot H$, the DC value is determined as:

$$DC = \left(\left(\sum_{i=0}^{W-1} p_i\right) + (W \gg 1)\right) \gg w,$$

$$w = \log_2(W),$$

wherein DC denotes the DC value, $f_{THR}$ denotes the first threshold value, W denotes the width of the current block, H denotes the height of the current block, and $P_i$ denotes a reference sample of the current block.

Optionally, another implementation of the second aspect provides, when $H > f_{THR} \cdot W$, the DC value is determined as:

$$DC = \left(\left(\sum_{i=0}^{H-1} p_i\right) + (H \gg 1)\right) \gg h,$$

$$h = \log_2(H),$$

wherein DC denotes the DC value, $f_{THR}$ denotes the second threshold value, W denotes the width of the current block, H denotes the height of the current block, and $P_i$ denotes reference sample of the current block.

A third aspect of the embodiments of the present application discloses an apparatus configured for performing the method according to the first aspect of the application. Further features and implementation forms of the apparatus according to the third aspect of the embodiments correspond to the features and implementation forms of the method according to the first aspect of the embodiments.

A fourth aspect of the embodiments of the present application discloses an apparatus configured for performing the method according to the second aspect of the embodiments. Further features and implementation forms of the apparatus according to the fourth aspect of the embodiments correspond to the features and implementation forms of the method according to the second aspect of the embodiments.

According to a fifth aspect, an embodiment relates to an apparatus for decoding intra prediction of a current block, wherein the apparatus includes a processor and a memory. The memory is storing instructions that cause the processor to perform the method according to the first aspect or the second aspect or any possible embodiment of the first or second aspect.

According to a sixth aspect, an embodiment relates to an apparatus for encoding intra prediction of a current block, wherein the apparatus includes a processor and a memory. The memory is storing instructions that cause the processor to perform the method according to the first aspect or the second aspect or any possible embodiment of the first or second aspect.

According to a seventh aspect, a computer-readable storage medium having stored thereon instructions that when executed cause one or more processors configured to encode or decode intra prediction of a current block is proposed. The instructions cause the one or more processors to perform a method according to the first or second aspect or any possible embodiment of the first or second aspect.

According to an eighth aspect, an embodiment relates to a computer program comprising program code for performing the method according to the first or second aspect or any possible embodiment of the first or second aspect when executed on a computer.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF DRAWINGS

In the following exemplary embodiments are described in more detail with reference to the attached figures and drawings, in which.

DETAILED DESCRIPTION OF EMBODIMENTS

In the following description, reference is made to the accompanying drawings, which form part of the disclosure, and in which are shown, by way of illustration, specific aspects in which the embodiments may be placed.

For instance, it is understood that a disclosure in connection with a described method may also hold true for a corresponding device or system configured to perform the method and vice versa. For example, if a specific method step is described, a corresponding device may include a unit to perform the described method step, even if such unit is not explicitly described or illustrated in the figures. Further, it is understood that the features of the various exemplary aspects described herein may be combined with each other, unless specifically noted otherwise.

Video coding typically refers to the processing of a sequence of pictures, which form the video or video sequence. The term picture, image or frame may be used/are used synonymously in the field of video coding as well as in this application. Each picture is typically partitioned into a set of non-overlapping blocks. The encoding/decoding of the picture is typically performed on a block level where e.g. inter frame prediction or intra frame prediction are used to generate a prediction block, to subtract the prediction block from the current block (block currently processed/to be processed) to obtain a residual block, which is further transformed and quantized to reduce the amount of data to be transmitted (compression) whereas at the decoder side the inverse processing is applied to the encoded/compressed block to reconstruct the block (video block) for representation.

Intra-prediction is a mechanism used in many video coding frameworks to increase compression efficiency in cases where only a given frame can be involved. The DC mode is one of the most frequently selected intra-prediction modes. The basic idea behind this mode is to calculate the average value DC of adjacent pixels $p_i$ that are typically placed on the top and left sides of a block. In conventional methods, a division operation is used to calculate the DC value, which leads to a more complicated calculation. To avoid the division operation, two components DC values for the reference samples $p_i$ are calculated to obtain the DC value. Both components DC values contribute equally to the DC value, which leads to less accuracy. The present disclosure provides a mechanism to obtain the average value of adjacent pixels with high accuracy or less complicated, so as to improve coding efficiency. In the following, embodiments of a system, an encoder, a decoder, and corresponding methods are described, which may simplify the calculation of intra-prediction value. The term "sample" in this disclosure is used to include but not limited to sample, pixel, sub-pixel, etc.

Figure 1:
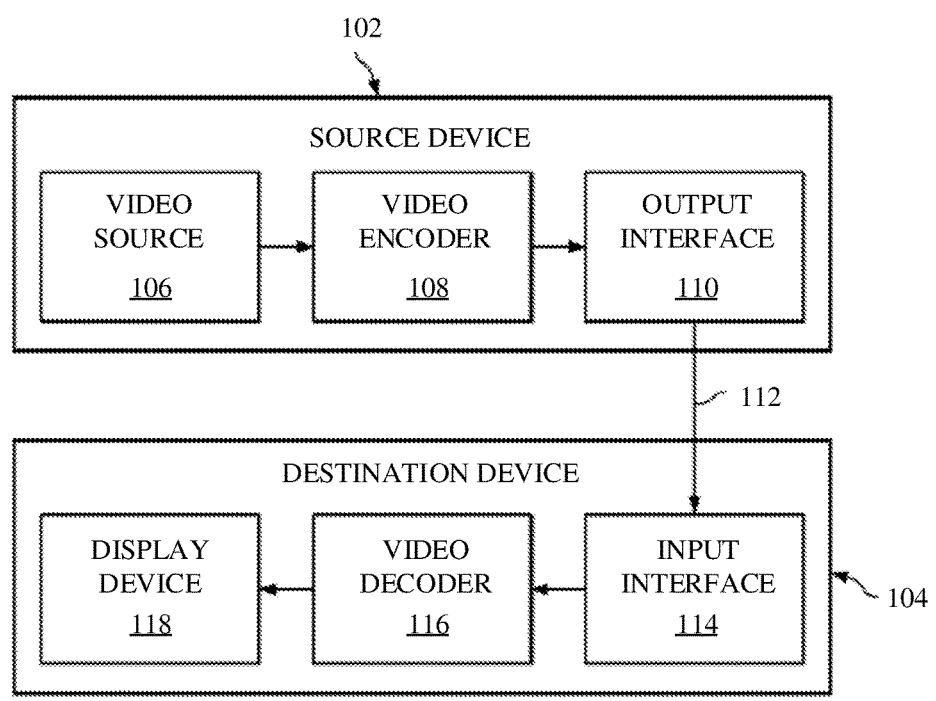
FIG. 1 shows a schematic diagram illustrating an example of a video encoding and decoding system 100.
Figure 2:
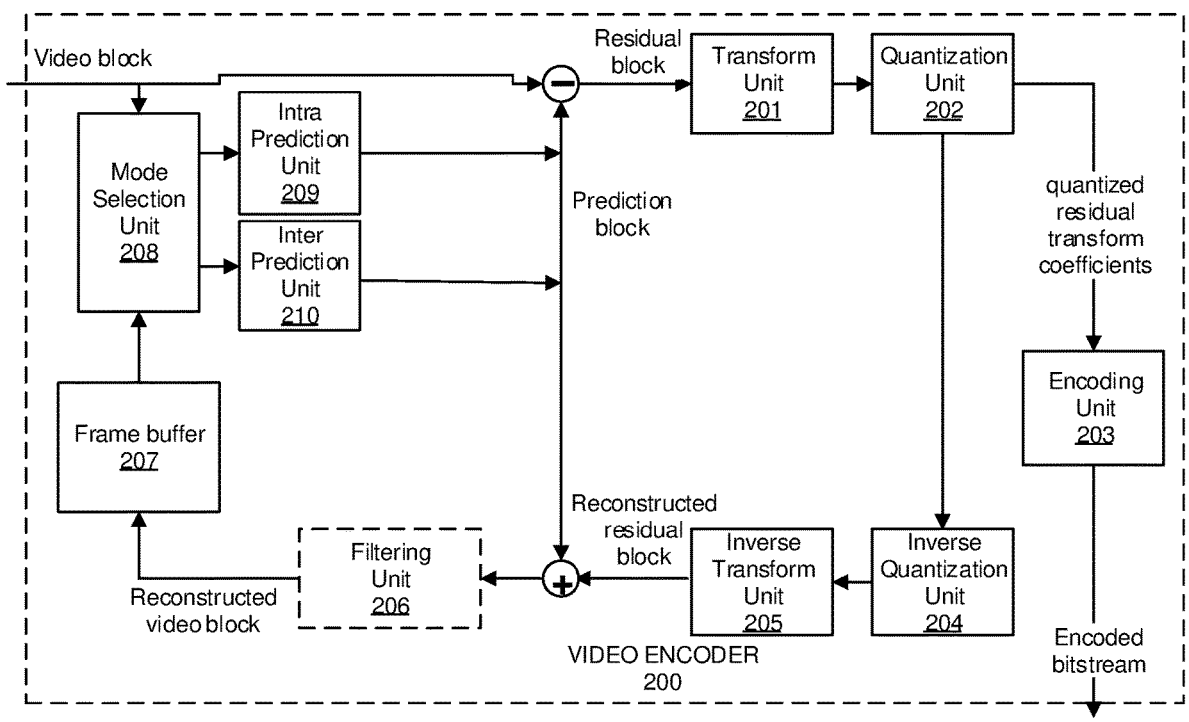
FIG. 2 shows a schematic diagram illustrating an example of a video encoder 200.
Figure 3:
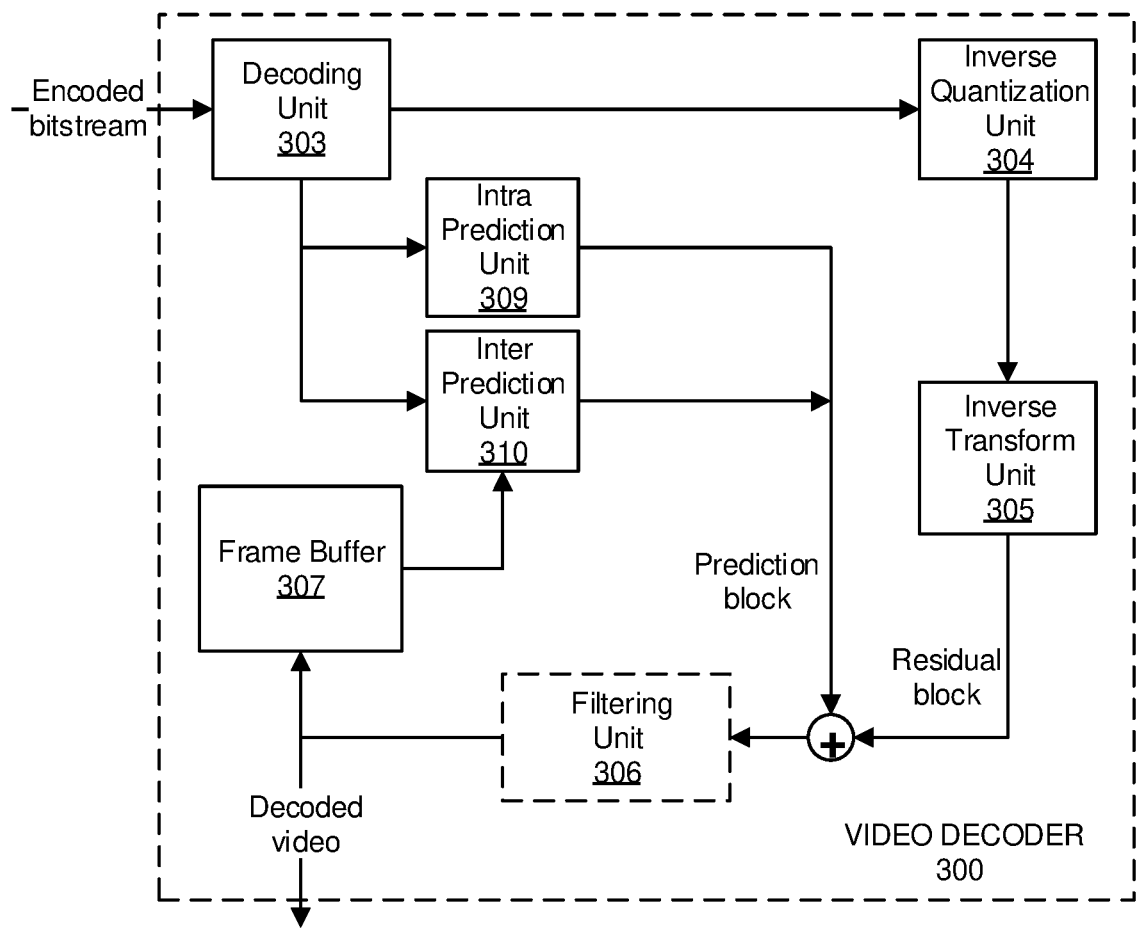
FIG. 3 shows a schematic diagram illustrating an example of a video decoder 300.

FIG. 1 is a block diagram illustrating an example video encoding and decoding system 100 that may utilize the techniques described in this disclosure, including techniques for encoding and decoding. The system 100 is not only applied to video encoding and decoding, but also applied to picture encoding and decoding. As shown in FIG. 1, system 100 includes a source device 102 that generates encoded video data to be decoded at a later time by a destination device 104. Video encoder 200 as shown in FIG. 2, is an example of a video encoder 108 of the source device 102. Video decoder 300 as shown in FIG. 3, is an example of a video decoder 116 of the destination device 104. Source device 102 and destination device 104 may comprise any of a wide range of devices, including desktop computers, notebooks (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 102 and destination device 104 may be equipped for wireless communication.

Destination device 104 may receive the encoded video data to be decoded via a link 112. Link 112 may include any type of medium or device capable of moving the encoded video data from source device 102 to destination device 104. In one example, link 112 may comprise a communication medium to enable source device 102 to transmit encoded video data directly to destination device 104 in real-time. The encoded video data may be modulated according to a communication standard, such as a wireless communication protocol, and transmitted to destination device 104. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 104.

Alternatively, encoded data may be output from output interface 110 to a storage device (not shown in FIG. 1). Similarly, encoded data may be accessed from the storage device by input interface 114. Destination device 104 may access stored video data from storage device via streaming or download. The techniques of this disclosure are not necessarily limited to wireless applications or settings. The techniques may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, system 100 may be configured to support one-way or two-way video transmission to support applications such as video streaming, video playback, video broadcasting, and/or video telephony.

In the example of FIG. 1, source device 102 includes a video source 106, a video encoder 108 and an output interface 110. In some cases, output interface 110 may include a modulator/demodulator (modem) and/or a transmitter. In source device 102, video source 106 may include a source such as a video capture device, e.g., a video camera, a video archive containing previously captured video, a video feed interface to receive video from a video content provider, and/or a computer graphics system for generating computer graphics data as the source video, or a combination of such sources. As one example, if video source 106 is a video camera, source device 102 and destination device 104 may form so-called camera phones or video phones. However, the techniques described in this disclosure may be applicable to video coding in general, and may be applied to wireless and/or wired applications.

The captured, pre-captured, or computer-generated video may be encoded by video encoder 108. The encoded video data may be transmitted directly to destination device 104 via output interface 110 of source device 102. The encoded video data may also (or alternatively) be stored onto the storage device for later access by destination device 104 or other devices, for decoding and/or playback.

Destination device 104 includes an input interface 114, a video decoder 116, and a display device 118. In some cases, input interface 114 may include a receiver and/or a modem. Input interface 114 of destination device 104 receives the encoded video data over link 112. The encoded video data communicated over link 112, or provided on the storage device, may include a variety of syntax elements generated by video encoder 108 for use by a video decoder, such as video decoder 116, in decoding the video data. Such syntax elements may be included with the encoded video data transmitted on a communication medium, stored on a storage medium, or stored on a file server.

Display device 118 may be integrated with, or external to, destination device 104. In some examples, destination device 104 may include an integrated display device and also be configured to interface with an external display device. In other examples, destination device 104 may be a display device. In general, display device 118 displays the decoded video data to a user, and may comprise any of a variety of display devices such as a liquid crystal display (LCD), a plasma display, an organic light emitting diode (OLED) display, or another type of display device.

Video encoder 108 and video decoder 116 may operate according to any kind of video compression standard, including but not limited to MPEG-2, MPEG-4, ITU-T H.263, ITU-T H.264/MPEG-4, Part 10, Advanced Video Coding (AVC), the High Efficiency Video Coding (HEVC), ITU-T H.266/Next Generation Video Coding (NGVC) standard.

It is generally contemplated that video encoder 108 of source device 102 may be configured to encode video data according to any of these current or future standards. Similarly, it is also generally contemplated that video decoder 116 of destination device 104 may be configured to decode video data according to any of these current or future standards.

Video encoder 108 and video decoder 116 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 108 and video decoder 116 may be included in one or more encoders or decoders, either of which may be integrated as part of a combined encoder/decoder (CODEC) in a respective device.

In video coding specifications, a video sequence typically includes a series of pictures. However, it is noted that the present disclosure is also applicable to fields in case interlacing is applied. Video encoder 108 may output a bitstream that includes a sequence of bits that forms a representation of coded pictures and associated data. Video decoder 116 may receive a bitstream generated by video encoder 108. In addition, video decoder 116 may parse the bitstream to obtain syntax elements from the bitstream. Video decoder 116 may reconstruct the pictures of the video data based at least in part on the syntax elements obtained from the bitstream. The process to reconstruct the video data may be generally reciprocal to the process performed by video encoder 108.

FIG. 2 shows a schematic diagram illustrating an example of a video encoder 200. The video encoder 200 is not only applied to video encoding, but also applied to picture encoding. The video encoder 200 comprises an input for receiving input blocks of frames or pictures of a video stream and an output for generating an encoded video bit stream. The video encoder 200 is adapted to apply prediction, transformation, quantization, and entropy coding to the video stream. The transformation, quantization, and entropy coding are carried out respectively by a transform unit 201, a quantization unit 202 and an encoding unit 203 so as to generate as an output the encoded video bit stream.

The video stream corresponds to a plurality of frames, wherein each frame is divided into blocks of a certain size that are either intra or inter coded. The blocks of for example the first frame of the video stream are intra coded by means of an intra prediction unit 209. An intra frame is coded using only the information within the same frame, so that it can be independently decoded and it can provide an entry point in the bit stream for random access. Blocks of other frames of the video stream are inter coded by means of an inter prediction unit 210: information from coded frames, which are called reference frames, are used to reduce the temporal redundancy, so that each block of an inter coded frame is predicted from a block of the same size in a reference frame. A mode selection unit 208 is adapted to select whether a block of a frame is to be processed by the intra prediction unit 209 or the inter prediction unit 210.

For performing inter prediction, the coded reference frames are processed by an inverse quantization unit 204, an inverse transform unit 205, a filtering unit 206 (optional) so as to obtain the reference frames that are then stored in a frame buffer 207. Particularly, reference blocks of the reference frame can be processed by these units to obtain reconstructed reference blocks. The reconstructed reference blocks are then recombined into the reference frame.

The inter prediction unit 210 comprises as input a current frame or picture to be inter coded and one or several reference frames or pictures from the frame buffer 207. Motion estimation and motion compensation are applied by the inter prediction unit 210. The motion estimation is used to obtain a motion vector and a reference frame based on certain cost function. The motion compensation then describes a current block of the current frame in terms of the transformation of a reference block of the reference frame to the current frame. The inter prediction unit 210 outputs a prediction block for the current block, wherein said prediction block minimizes the difference between the current block to be coded and its prediction block, i.e. minimizes the residual block. The minimization of the residual block is based e.g., on a rate-distortion optimization procedure.

The difference between the current block and its prediction, i.e. the residual block, is then transformed by the transform unit 201. The transform coefficients are quantized and entropy coded by the quantization unit 202 and the encoding unit 203. The encoded video bit stream comprises intra coded blocks and inter coded blocks.

FIG. 3 shows a schematic diagram illustrating an example of a video decoder 300. The video decoder 300 is not only applied to video decoding, but also applied to picture decoding. The video decoder 300 comprises particularly a frame buffer 307, an inter prediction unit 310. The frame buffer 307 is adapted to store at least one reference frame obtained from the encoded video bit stream. The inter prediction unit 310 is adapted to generate a prediction block of a current block of a current frame from a reference block of the reference frame.

The decoder 300 is adapted to decode the encoded video bit stream generated by the video encoder 200, and both the decoder 300 and the coder 200 generate identical predictions. The features of the frame buffer 307, the inter prediction unit 310 are similar to the features of the frame buffer 207, the inter prediction unit 210, of FIG. 2.

Particularly, the video decoder 300 comprises units that are also present in the video encoder 200 like e.g., an inverse quantization unit 304, an inverse transform unit 305, a filtering unit 306 (optional) and an intra prediction unit 309, which respectively correspond to the inverse quantization unit 204, the inverse transform unit 205, the filtering unit 206 and the intra prediction unit 209 of the video encoder 200. A decoding unit 303 is adapted to decode the received encoded video bit stream and to correspondingly obtain quantized residual transform coefficients. The quantized residual transform coefficients are fed to the inverse quantization unit 304 and an inverse transform unit 305 to generate a residual block. The residual block is added to a prediction block and the addition is fed to the filtering unit 306 to obtain the decoded video. Frames of the decoded video can be stored in the frame buffer 307 and serve as a reference frame for inter prediction.

The video encoder 200 may split the input video frame into blocks before coding. The term "block" in this disclosure is used for any type block or for any depth block, for example, the term "block" is included but not limited to root block, block, sub-block, leaf node, and etc. The blocks to be coded do not necessarily have the same size. One picture may include blocks of different sizes and the block rasters of different pictures of video sequence may also differ.

Figure 4:
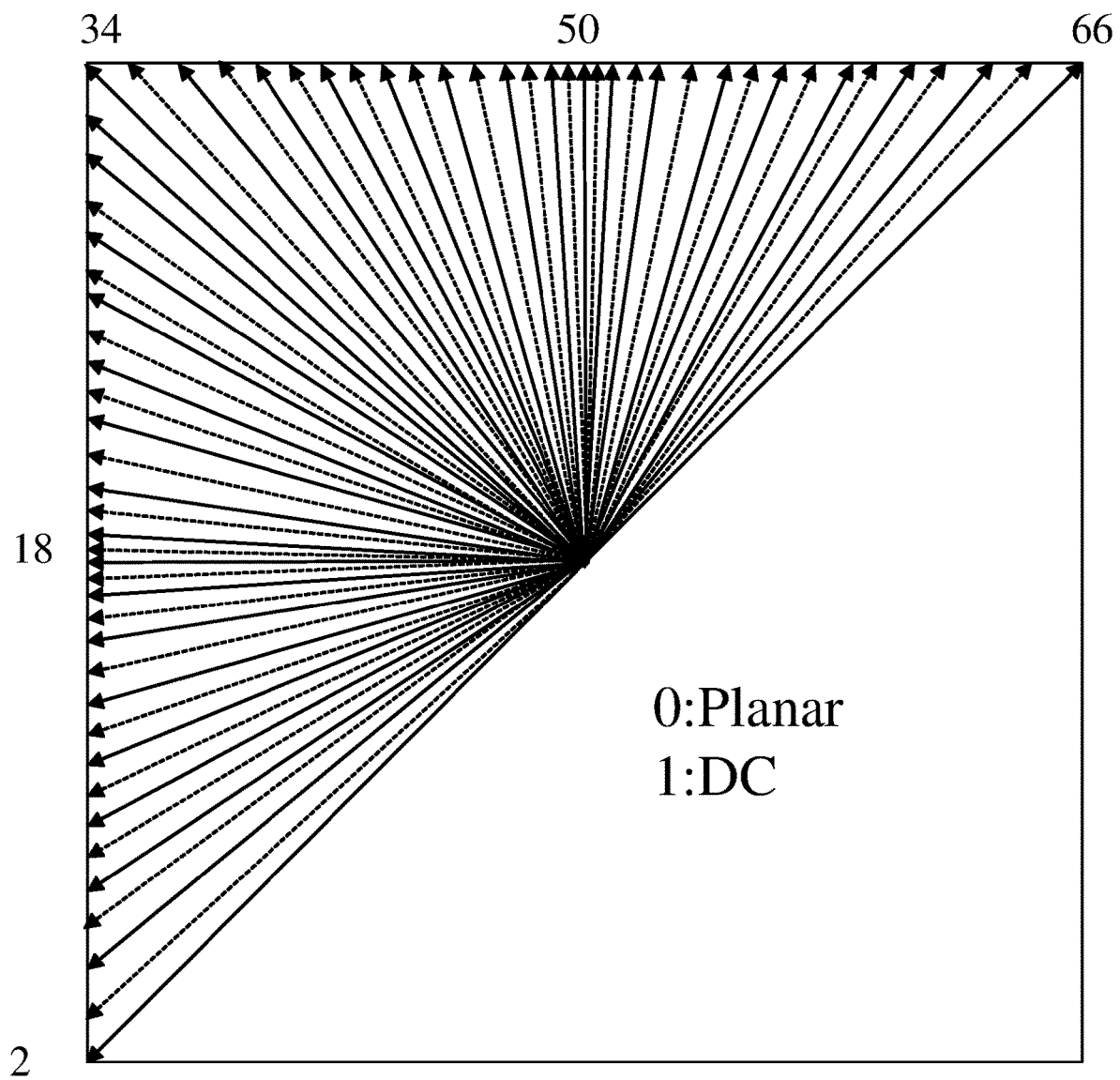
FIG. 4 shows a schematic diagram illustrating proposed 67 intra prediction modes.

According to the HEVC/H.265 standard, 35 intra prediction modes are available. As shown in FIG. 4, this set contains the following modes: planar mode (the intra prediction mode index is 0), DC mode (the intra prediction mode index is 1), and directional (angular) modes that cover the 180° range and have the intra prediction mode index value range of 2 to 34 shown by black arrows in FIG. 4. To capture the arbitrary edge directions present in natural video, the number of directional intra modes is extended from 33, as used in HEVC, to 65. The additional directional modes are depicted as dotted arrows in FIG. 4, and the planar and DC modes remain the same. It is worth noting that the range that is covered by intra prediction modes can be wider than 180°. In particular, 62 directional modes with index values of 3 to 64 cover the range of approximately 230°, i.e. several pairs of modes have opposite directionality. In the case of the HEVC Reference Model (HM) and JEM platforms, only one pair of angular modes (namely, modes 2 and 66) has opposite directionality as shown in FIG. 4. For constructing a predictor, conventional angular modes take reference samples and (if needed) filter them to get a sample predictor. The number of reference samples required for constructing a predictor depends on the length of the filter used for interpolation (e.g., bilinear and cubic filters have lengths of 2 and 4, respectively).

The disclosure proposes a mechanism to avoid a division operation with high accuracy while calculating an intra-prediction value, such as a DC value. The disclosure takes into account actual lengths of adjacent sides, which requires 1 multiplication per block, some other elementary arithmetic operations and a look up table (LUT). The size of the LUT is reduced as compared with a straightforward implementation of this approach. Multiplication operation and the LUT are not required for square blocks that can be important for the smallest blocks (4×4 for luma and 2×2 for chroma) to avoid such operations as a multiplication for the worst case when a picture or its part is subdivided into the smallest blocks. In addition, the proposed mechanism can be combined with the conventional methods and/or other simplifications. In this case, the proposed approach is used for larger blocks and/or elongated blocks. The technique based on conventional methods is applied to blocks of smaller sizes and with the shape close to square. Besides, DC value can be estimated by taking reference samples only along with a longer side for very elongated blocks (e.g., 64×4). Details on the calculation process are described below.

Figure 5A:
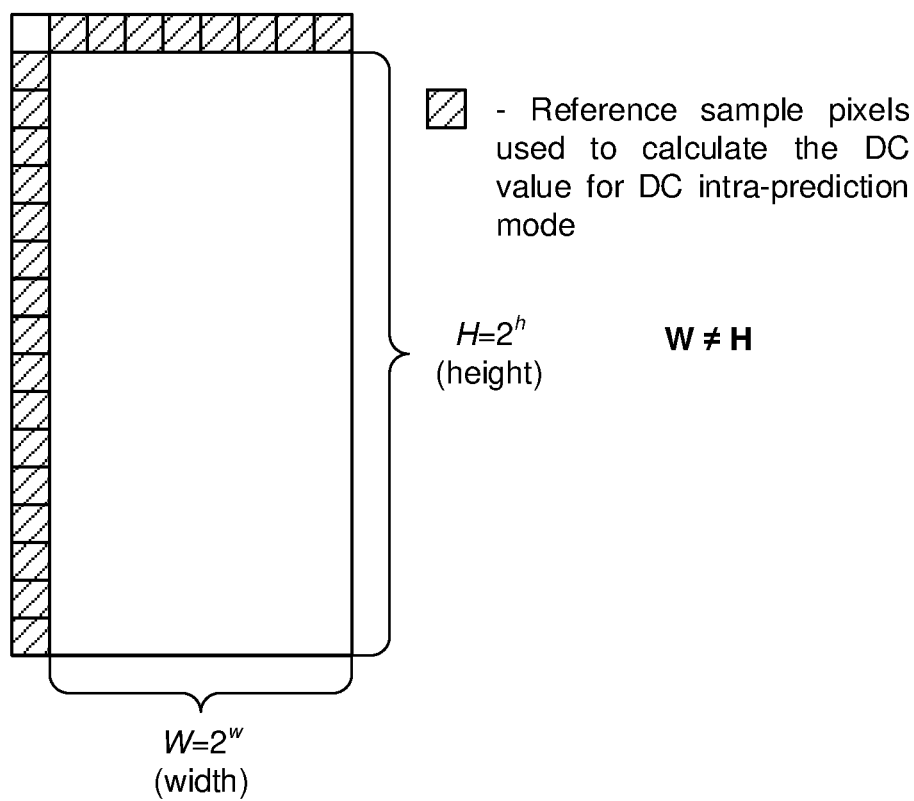
FIG. 5(a) shows an exemplary DC intra-prediction mode for rectangular blocks.

FIG. 5(*a*) is an embodiment of a given intra-prediction mode for rectangular blocks, for example, the DC intra-prediction mode. As shown in FIG. 5(*a*), W≠H, and the current block is a rectangular block, where W and H denote the width and height of a block, respectively. Taking into account that W=$2^w$ and H=$2^h$ (i.e. the lengths of block sides are powers of 2), the sum of width and height can be written as follows:

when *W=H*, $$W+H=2^w+2^h=2^w+2^w=2^{w+1}. \quad (1)$$

When *W>H*, $$W+H=2^h(2^{w-h}+1). \quad (2\text{-}1)$$

When *H>W*, $$W+H=2^w(2^{h-w}+1). \quad (2\text{-}2)$$

When W>H, aspect ratios $R_A$ of horizontally and vertically oriented blocks is:

$$R_A=2^{w-h} \quad (3\text{-}1)$$

When H>W, aspect ratios $R_A$ of horizontally and vertically oriented blocks is:

$$R_A=2^{h-w} \quad (3\text{-}2)$$

Let m=min (w,h), then, formulas (2-1) and (2-2) can be rewritten as follows:

$$W+H=2^m(R_A+1). \quad (4)$$

The DC average value of adjacent pixels $p_i$ is calculated as formula (5):

$$DC = \frac{\sum_{i=0}^{W+H-1} p_i}{W+H}, \quad (5)$$

Substituting formula (4) into formula (5), $$DC = \frac{\sum_{i=0}^{W+H-1} p_i}{2^m(R_A+1)}. \quad (6)$$

Formula (6) can be rewritten as follows:

$$DC = \left(\left(\frac{1}{R_A+1} \cdot \sum_{i=0}^{W+H-1} p_i\right) + (1 \ll (m-1))\right) \gg m. \quad (7)$$

where << and >> are left and right shift operations, respectively.

Since the partitioning depth is typically limited and known at both encoder and decoder sides a priori, in general, values of $$\frac{1}{R_A+1}$$

can be tabulated using a LUT where the quantity of records is computed as follows:

$$N_{LUT} = \log_2 L_{max} - \log_2 L_{min} = \log_2 \frac{L_{max}}{L_{min}}, \quad (8)$$

where $L_{min}$ and $L_{max}$ are minimal and maximum lengths of a block side, respectively. According to the default settings of QuadTree plus Binary Tree (QTBT), $L_{min}=4$ and $L_{max}=128$, i.e.

$$N_{LUT} = \log_2 \frac{128}{4} = \log_2 32 = 5.$$

For square blocks, the conventional method may be applied or one more records should be added to the LUT.

Expression $$\frac{1}{R_A + 1}$$

takes the following values:

$$\frac{1}{2^1 + 1} = \frac{1}{3}, \frac{1}{2^2 + 1} = \frac{1}{5}, \frac{1}{2^3 + 1} = \frac{1}{9}, \frac{1}{2^4 + 1} = \frac{1}{17}, \frac{1}{2^5 + 1} = \frac{1}{33}.$$

To keep the calculations of DC value accurate while computing $$\frac{1}{R_A + 1} \cdot \sum_{i=0}^{W+H-1} p_i,$$

reformulate it as follows:

$$\left(\left(\frac{(1 \ll q)}{R_A + 1} \cdot \sum_{i=0}^{W+H-1} p_i\right) + (1 \ll (q-1))\right) \gg q, \quad (9)$$

where q is an integer parameter that takes the maximum possible value that does not cause an overflow of the used data type. The formula (9) may provide a way to calculate DC value without division operation using fixed point multiplications and bit shift operation. Substituting expression (9) into formula (7):

$$DC = \qquad (10).$$

$$\left(\left(\left(\left(\frac{(1 \ll q)}{R_A + 1} \cdot \sum_{i=0}^{W+H-1} p_i\right) + (1 \ll (q-1))\right) \gg q\right) + (1 \ll (m-1))\right) \gg m.$$

Formula (10) can be simplified as follows:

$$DC = \left(\left(\frac{(1 \ll q)}{R_A + 1} \cdot \sum_{i=0}^{W+H-1} p_i\right) + (1 \ll (m+q-1))\right) \gg (m+q). \quad (11).$$

Formula (11) can affect calculation accuracy but can reduce the computational complexity of formula (10). In either case, $$\frac{(1 \ll q)}{R_A + 1}$$

may be tabulated and stored in the LUT. It is worth to note that the value of q can be different for different values of $R_A$ to maximize the accuracy of calculations.

As shown above, a multiplication operation is required if formulas (10) or (11) is used. On the one hand, it can be critical if a picture or one of its regions is split into very small blocks (such as 4×4 for luma and 2×2 for chroma). In this situation (for example, the square block or close to a square block), the conventional approach may be used. On the other hand, the conventional DC calculation approach can adversely affect the coding efficiency of DC mode if a block is very asymmetric (e.g., 32×4). So, the proposed technique based on formulas (10) and (11) can be combined with the approach based on conventional DC calculation approach, for example, formulas (12)-(14).

$$DC_{left} = \left(\left(\sum_{j=0}^{H-1} p_j\right) + (H \gg 1)\right) \gg h, \quad (12)$$

$$DC_{up} = \left(\left(\sum_{i=0}^{W-1} p_i\right) + (W \gg 1)\right) \gg w, \quad (13)$$

$$DC = (DC_p + DC_{left}) \gg 1. \quad (14)$$

where $p_i$ represent the reference samples above the current block and $P_j$ represent the reference samples left of the current block.

Another mechanism that keeps the design of DC mode computationally simple for elongated blocks (e.g., 64×4) is based on the assumption:

$$DC = \frac{\left(\sum_{i=0}^{W+H-1} p_i\right) + ((W+H) \gg 1)}{W + H} \approx \frac{\left(\sum_{i=0}^{W-1} p_i\right) + (W \gg 1)}{W} = \quad (15)$$

$$\left(\left(\sum_{i=0}^{W-1} p_i\right) + (W \gg 1)\right) \gg w \text{ if } W > f_{THR} \cdot H.$$

$$DC = \frac{\left(\sum_{i=0}^{W+H-1} p_i\right) + ((W+H) \gg 1)}{W + H} \approx \frac{\left(\sum_{i=0}^{H-1} p_i\right) + (H \gg 1)}{H} = \quad (16)$$

$$\left(\left(\sum_{i=0}^{H-1} p_i\right) + (H \gg 1)\right) \gg h \text{ if } H > f_{THR} \cdot W.$$

$f_{THR}$ is a threshold value (e.g., $f_{THR}$=8). Formulas (15) and (16) may have different or same threshold value. So, only reference samples of the longest block side are used to calculate DC value.

Another embodiment that only the longer side component is considered when calculating DC value is shown below:

$$DC = \left(\left(\sum_{i=0}^{W-1} p_i\right) + (W \gg 1)\right) \gg w, \quad (17)$$

if W≥H, $$DC = \left(\left(\sum_{i=0}^{H-1} p_i\right) + (H \gg 1)\right) \gg h, \quad (18)$$

if H≥W, where w=$\log_2$(w), h=$\log_2$(H), W,H are the width and height (respectively) of the predicted block. In these examples, the threshold value $f_{THR}$ is 1.

Figure 5B:
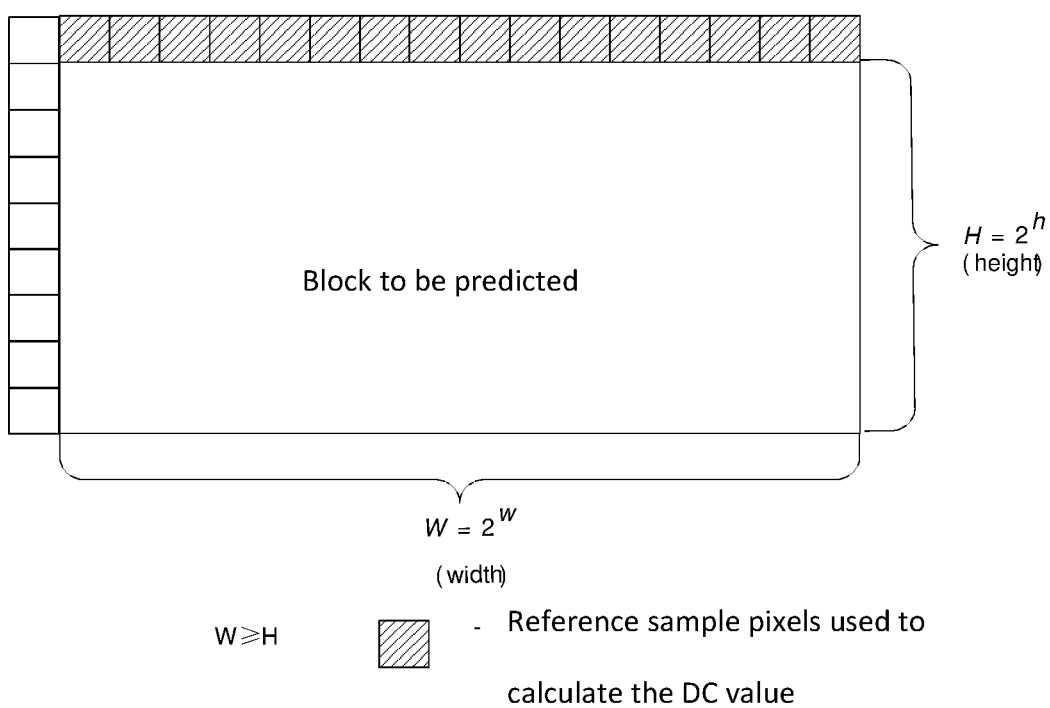
FIG. 5(b) shows another exemplary DC intra-prediction mode for rectangular blocks.
Figure 5C:
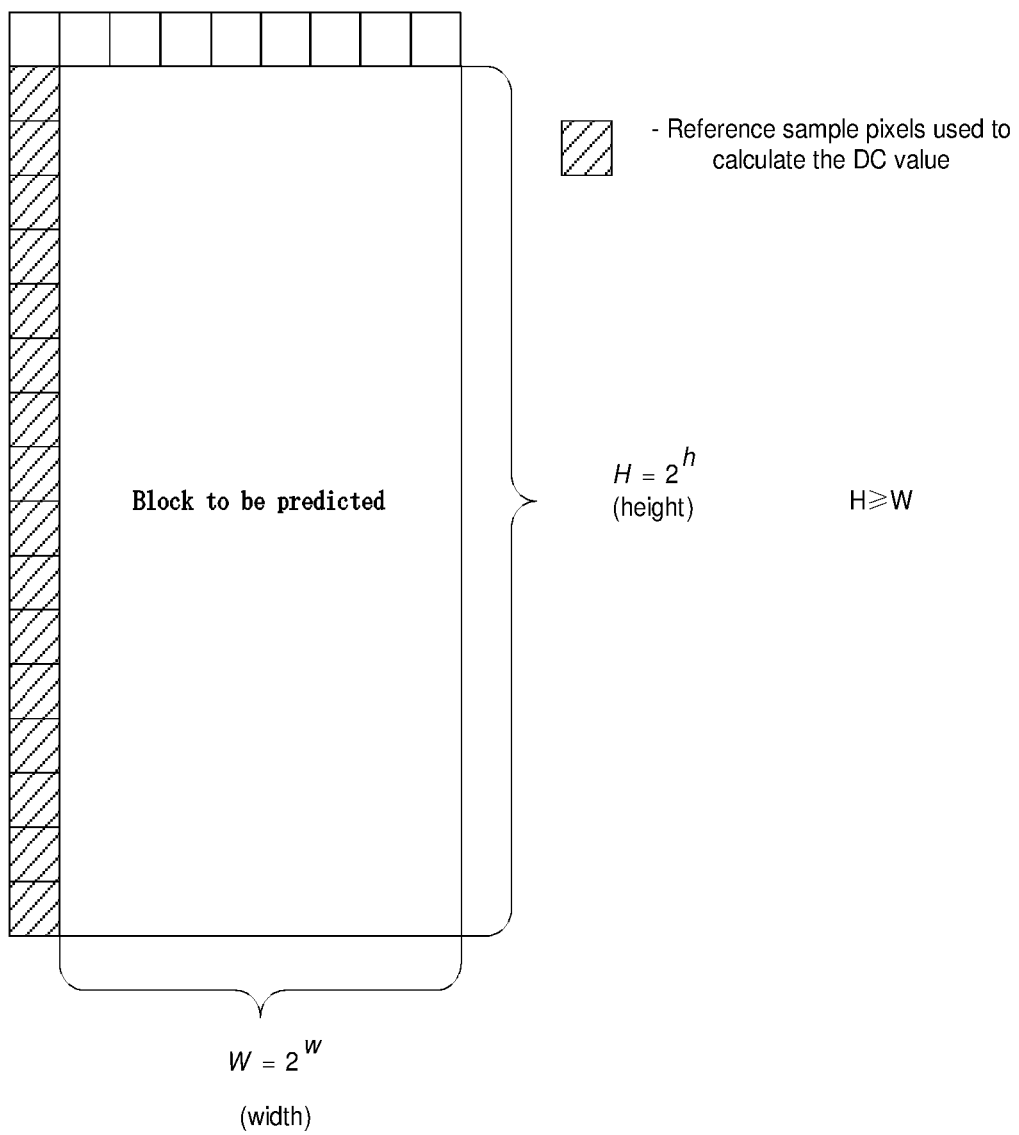
FIG. 5(c) shows yet another exemplary DC intra-prediction mode for rectangular blocks.

An example for equation (17) is shown in FIG. 5(b), and an example for equation (18) is shown in FIG. 5(c).

Different exemplary values of $$\frac{(1 \ll q)}{R_A + 1}$$

and q are shown in Tables 1 and 2.

TABLE 1

The values of $\frac{(1 \ll q)}{R_A + 1}$ for different values of q if it does not depend on $R_A$

| | Aspect ratio ($R_A$) | | | | | |
|---|---|---|---|---|---|---|
| q | 1 (square block) | 2 | 4 | 8 | 16 | 32 |
| 5 | 32 | 11 | 6 | 4 | 2 | 1 |
| 6 | 64 | 21 | 13 | 7 | 4 | 2 |
| 7 | 128 | 43 | 26 | 14 | 8 | 4 |
| 8 | 256 | 85 | 51 | 28 | 15 | 8 |
| 9 | 512 | 171 | 102 | 57 | 30 | 16 |
| 10 | 1024 | 341 | 205 | 114 | 60 | 31 |
| 11 | 2048 | 683 | 410 | 228 | 120 | 62 |
| 12 | 4096 | 1365 | 819 | 455 | 241 | 124 |

TABLE 2

The values of a shift parameter $q_{R_A}$ and $\frac{(1 \ll q)}{R_A + 1}$ for different values of $q_{const}$ if $q = q_{const} + q_{R_A}$ depens on $R_A$

| | | Aspect ratio ($R_A$) | | | | | | | | | |
|---|---|---|---|---|---|---|---|---|---|---|---|
| | | 1 (square block) | | 2 | | 4 | | 8 | | 16 | | 32 |
| $q_{const}$ | $q_{R_A}$ | $\frac{(1 \ll q)}{R_A+1}$ | $q_{R_A}$ | $\frac{(1 \ll q)}{R_A+1}$ | $q_{R_A}$ | $\frac{(1 \ll q)}{R_A+1}$ | $q_{R_A}$ | $\frac{(1 \ll q)}{R_A+1}$ | $q_{R_A}$ | $\frac{(1 \ll q)}{R_A+1}$ | $q_{R_A}$ | $\frac{(1 \ll q)}{R_A+1}$ |
| 5 | 1 | 32 | 1 | 21 | 2 | 23 | 3 | 28 | 4 | 30 | 3 | 31 |
| 6 | 1 | 64 | 1 | 43 | 2 | 51 | 3 | 57 | 4 | 60 | 3 | 62 |
| 7 | 1 | 128 | 1 | 85 | 2 | 102 | 3 | 114 | 4 | 120 | 3 | 124 |
| 8 | 1 | 256 | 1 | 171 | 2 | 205 | 3 | 228 | 4 | 241 | 3 | 248 |
| 9 | 1 | 512 | 1 | 341 | 2 | 410 | 3 | 455 | 4 | 482 | 3 | 496 |
| 10 | 1 | 1024 | 1 | 683 | 2 | 819 | 3 | 910 | 4 | 964 | 3 | 993 |
| 11 | 1 | 2048 | 1 | 1365 | 2 | 1638 | 3 | 1820 | 4 | 1928 | 3 | 1986 |
| 12 | 1 | 4096 | 1 | 2731 | 2 | 3277 | 3 | 3641 | 4 | 3855 | 3 | 3972 |

Figure 6:
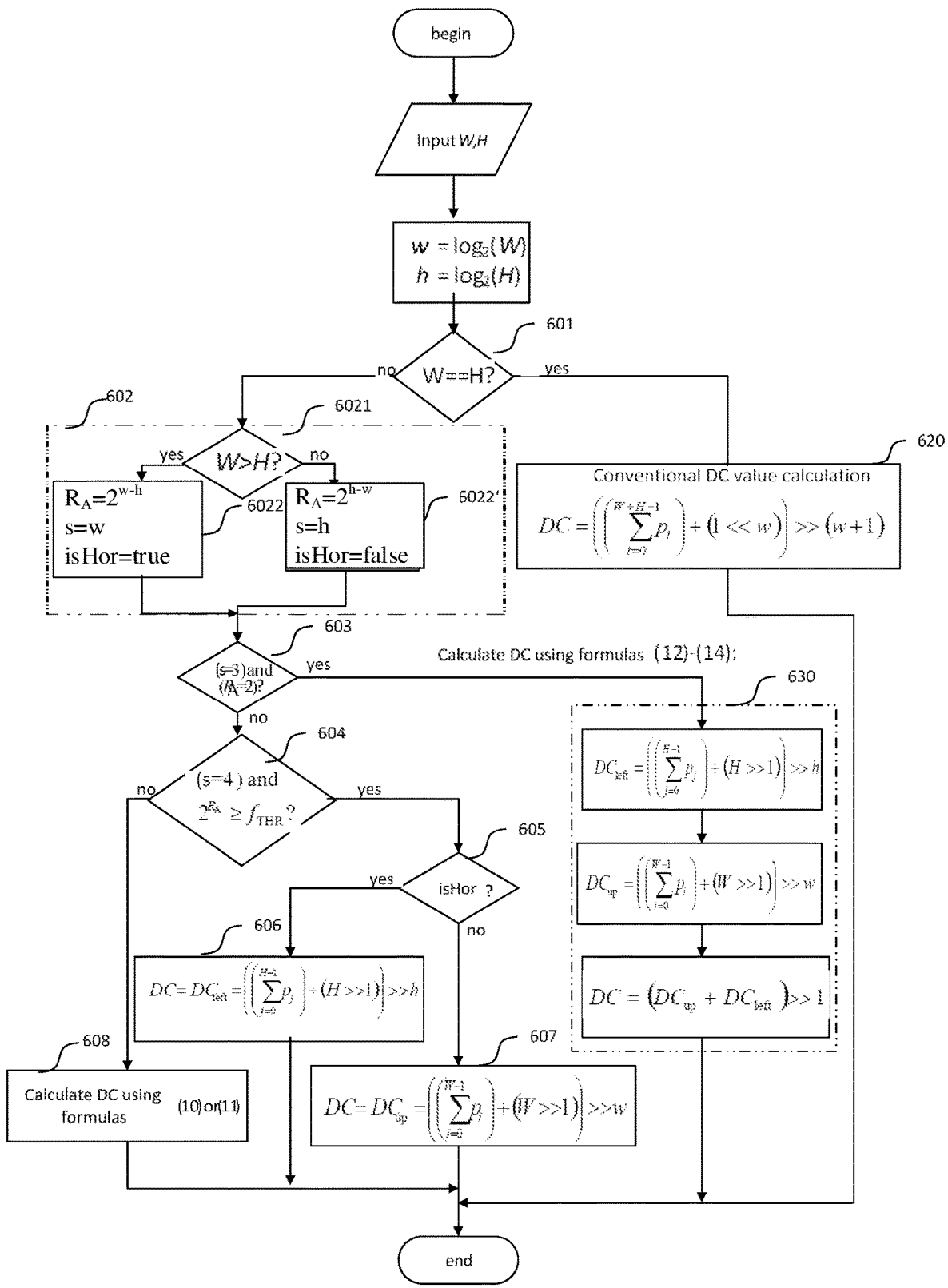
FIG. 6 shows exemplary embodiment of DC value calculation.

FIG. 6. shows an exemplary embodiment of DC value calculation using the embodiments presented herein. The input of the process are the width and the height of a block and the corresponding logarithms of width and height.

In the embodiment, three block shape cases are considered. One case is a square shape when width and height are equal, and two rectangular shape cases when the width is longer than height and vice versa.

The first step 601 is to distinguish a case of a square shape by comparing width and height values. For the square shape case, DC value is computed conventionally at step 620 and the rest of the steps are skipped.

The second step 602, which includes step 6021, step 6022 and step 6022', is to distinguish between the rest two rectangular shape cases at step 6021 and store the result in "isHor" variable at step 6022 or 6022'. For both of these cases, values of aspect ratio $R_A$, and larger side index s is assigned correspondingly.

The third step 603 is to define whether the block is small by comparing s to a predefined threshold, e.g. 3, and the block is not an elongated one. The latter condition is checked by thresholding RA by another threshold value (e.g. 2). If both of these conditions are fulfilled, at step 630, the DC value is calculated using formulas (12)-(14) described above and the rest of the steps are skipped.

The forth step 604 is to define whether the block is elongated and large enough using the conditions shown in FIG. 6, for example, comparing s to a predefined threshold, e.g. 4, and the block is not an elongated one. The latter condition is checked by thresholding $2^{RA}$ by another threshold value $f_{THR}$. Denotations of variables are disclosed in the description above. If these conditions are met, the next step 605 is to decide whether the variable "isHor" is true or false. DC value is calculated from the reference samples of the left side (if "isHor" is false) at step 607, or from the top side (if "isHor" is true) at step 606.

The last step 608 of FIG. 6 is to calculate the DC value by default, using formulas (10)-(11).

Another embodiment considers the colorplane for which prediction is being performed. For example, condition "W==H?" in FIG. 6 could be amended to "W==H or isChroma?". "isChroma" variable is set to true if the block being predicted belongs to the chroma color plane (e.g., Cb or Cr) and is set to false if the block belongs to luma color plane.

Figure 7:
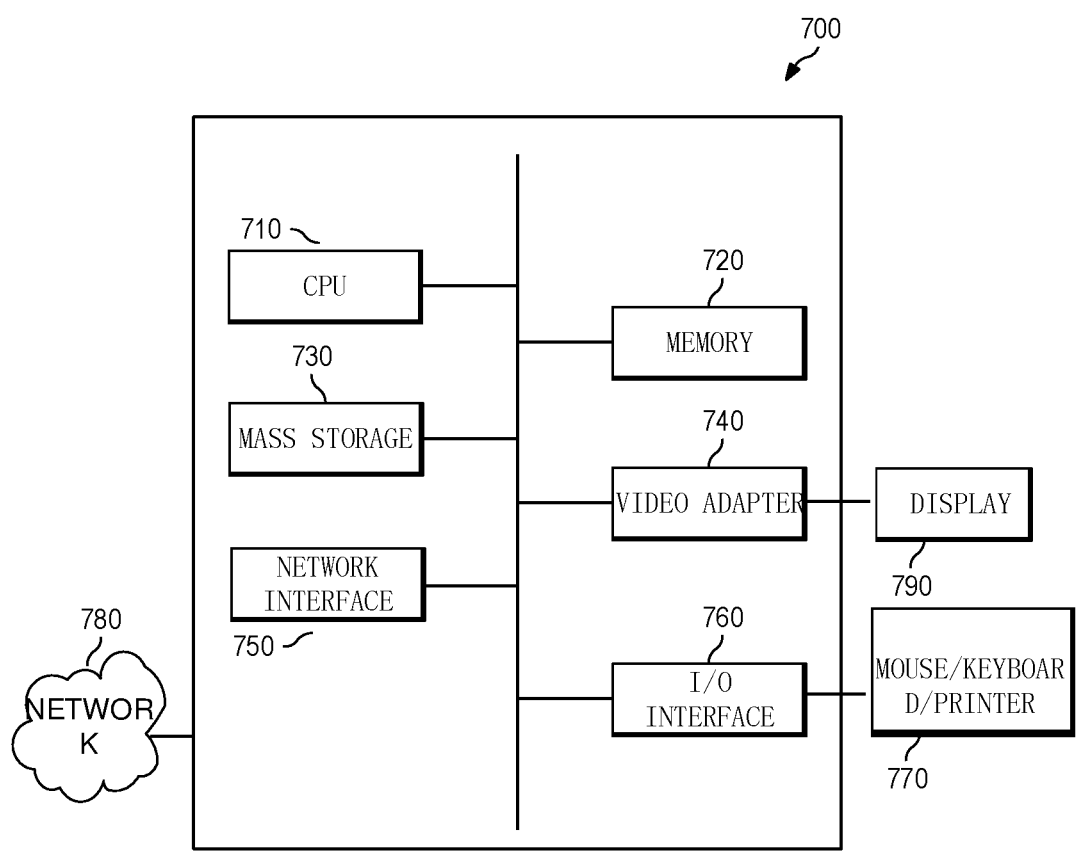
FIG. 7 is a schematic diagram illustrating an exemplary structure of an apparatus.

FIG. 7 is a block diagram of an apparatus 700 that can be used to implement various embodiments. The apparatus 700 may be the source device 102 as shown in FIG. 1, or the video encoder 200 as shown in FIG. 2, or the destination device 104 as shown in FIG. 1, or the video decoder 300 as shown in FIG. 3. Additionally, the apparatus 700 can host one or more of the described elements. In some embodiments, the apparatus 700 is equipped with one or more input/output devices, such as a speaker, microphone, mouse, touchscreen, keypad, keyboard, printer, display, and the like. The apparatus 700 may include one or more central processing units (CPUs) 710, a memory 720, a mass storage 730, a video adapter 740, and an I/O interface 760 connected to a bus. The bus is one or more of any type of several bus architectures including a memory bus or memory controller, a peripheral bus, a video bus, or the like.

The CPU 710 may have any type of electronic data processor. The memory 720 may have, or be, any type of system memory such as static random access memory (SRAM), dynamic random access memory (DRAM), synchronous DRAM (SDRAM), read-only memory (ROM), a combination thereof, or the like. In an embodiment, the memory 720 may include ROM for use at boot-up, and DRAM for program and data storage for use while executing programs. In embodiments, the memory 720 is non-transitory. The mass storage 730 includes any type of storage device that stores data, programs, and other information and to make the data, programs, and other information accessible via the bus. The mass storage 730 includes, for example, one or more of a solid state drive, hard disk drive, a magnetic disk drive, an optical disk drive, or the like.

The video adapter 740 and the I/O interface 760 provide interfaces to couple external input and output devices to the apparatus 700. For example, the apparatus 700 may provide SQL command interface to clients. As illustrated, examples of input and output devices include a display 790 coupled to the video adapter 740 and any combination of mouse/keyboard/printer 770 coupled to the I/O interface 760. Other devices may be coupled to the apparatus 700, and additional or fewer interface cards may be utilized. For example, a serial interface card (not shown) may be used to provide a serial interface for a printer.

The apparatus 700 also includes one or more network interfaces 750, which includes wired links, such as an Ethernet cable or the like, and/or wireless links to access nodes or one or more networks 780. The network interface 750 allows the apparatus 700 to communicate with remote units via the networks 780. For example, the network interface 750 may provide communication to database. In an embodiment, the apparatus 700 is coupled to a local-area network or a wide-area network for data processing and communications with remote devices, such as other processing units, the Internet, remote storage facilities, or the like.

The advantages of the present disclose are as follows:
Multiplication is used with high accuracy, for example formulas (7), (10) and (11), to replace a division operation in the conventional method;
size of the required LUT is kept small;
the proposed technique can be combined with other approaches to reduce the computational complexity of the worst case for DC mode, for example, combine with formulas (12)-(14). Different blocks may use same or different techniques, such as, block 1 may use formula (7), block 2 may use formula (10), block 3 may use formula (11), block 4 may use formulas (12)-(14), etc.; or blocks use same formula (7), or (10), or (11), or (15) or (16); or any combinations between the proposed techniques; or any combinations between the proposed techniques and conventional methods; and/or
for very elongated blocks (e.g., 64×4), the shortest side can be skipped to simplify calculations, for example, formulas (15) and (16).

The embodiments may be applied, for example, to other intra-prediction techniques such as DWDIP (Distance-Weighted Directional Intra-Prediction) or LIP (Linear Intra-Prediction), respectively. The step for gradual component of secondary reference samples for DWDIP uses the same mechanism.

Implementations of the subject matter and the operations described in this disclosure may be implemented in digital electronic circuitry, or in computer software, firmware, or hardware, including the structures disclosed in this disclosure and their structural equivalents, or in combinations of one or more of them. Implementations of the subject matter described in this disclosure may be implemented as one or more computer programs, i.e., one or more modules of computer program instructions, encoded on computer storage medium for execution by, or to control the operation of, data processing apparatus. Alternatively or in addition, the program instructions may be encoded on an artificially-generated propagated signal, for example, a machine-generated electrical, optical, or electromagnetic signal that is generated to encode information for transmission to suitable receiver apparatus for execution by a data processing apparatus. A computer storage medium, for example, the computer-readable medium, may be, or be included in, a computer-readable storage device, a computer-readable storage substrate, a random or serial access memory array or device, or a combination of one or more of them. Moreover, while a computer storage medium is not a propagated signal, a computer storage medium may be a source or destination of computer program instructions encoded in an artificially-generated propagated signal. The computer storage medium may also be, or be included in, one or more separate physical and/or non-transitory components or media (for example, multiple CDs, disks, or other storage devices).

In some implementations, the operations described in this disclosure may be implemented as a hosted service provided on a server in a cloud computing network. For example, the computer-readable storage media may be logically grouped and accessible within a cloud computing network. Servers within the cloud computing network may include a cloud computing platform for providing cloud-based services. The terms "cloud," "cloud computing," and "cloud-based" may be used interchangeably as appropriate without departing from the scope of this disclosure. Cloud-based services may be hosted services that are provided by servers and delivered across a network to a client platform to enhance, supplement, or replace applications executed locally on a client computer. The circuit may use cloud-based services to quickly receive software upgrades, applications, and other resources that would otherwise require a lengthy period of time before the resources may be delivered to the circuit.

A computer program (also known as a program, software, software application, script, or code) may be written in any form of programming language, including compiled or interpreted languages, declarative or procedural languages, and it may be deployed in any form, including as a stand-alone program or as a module, component, subroutine, object, or other unit suitable for use in a computing environment. A computer program may, but need not, correspond to a file in a file system. A program may be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program may be deployed to be executed on one computer or on multiple computers that are located at one site or distributed across multiple sites and interconnected by a communication network.

The processes and logic flows described in this disclosure may be performed by one or more programmable processors executing one or more computer programs to perform actions by operating on input data and generating output. The processes and logic flows may also be performed by, and apparatus may also be implemented as, special purpose logic circuitry, for example, an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, for example, magnetic, magneto-optical disks, or optical disks. However, a computer need not have such devices. Moreover, a computer may be embedded in another device, for example, a mobile telephone, a personal digital assistant (PDA), a mobile audio or video player, a game console, a Global Positioning System (GPS) receiver, or a portable storage device (for example, a universal serial bus (USB) flash drive), to name just a few. Devices suitable for storing computer program instructions and data include all forms of non-volatile memory, media and memory devices, including by way of example semiconductor memory devices, for example, EPROM, EEPROM, and flash memory devices; magnetic disks, for example, internal hard disks or removable disks; magneto-optical disks; and CD-ROM and DVD-ROM disks. The processor and the memory may be supplemented by, or incorporated in, special purpose logic circuitry.

While this disclosure contains many specific implementation details, these should not be construed as limitations on the scope of any implementations or of what may be claimed, but rather as descriptions of features specific to particular implementations. Certain features that are described in this disclosure in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

Thus, particular implementations of the subject matter have been described. Other implementations are within the scope of the following claims. In some cases, the actions recited in the claims may be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A method for DC intra prediction mode of a current block of a picture, the method implemented by an encoder and comprising:
    comparing a width of the current block with a height of the current block, wherein the current block is a coding unit (CU);
    when the width is greater than the height, determining a DC value of the current block based on reference samples only in a neighboring block on a top side of the current block; or when the height is greater than the width, determining a DC value of the current block based on reference samples only in a neighboring block on a left side of the current block; and
    outputting a bitstream that includes a sequence of bits indicating the DC intra prediction mode;
    wherein the width W of the current block is $W=2^w$ and the height H of the current block is $H=2^h$, h and w are integer numbers;
    the method further comprising comparing W, H, and $f_{THR}$, wherein either:
    $W > f_{THR} \cdot H$, and an aspect ratio $R_A$ of the current block is $R_A = 2^{w-h}$; or
    $H > f_{THR} \cdot W$, and the aspect ratio $R_A$ of the current block is $R_A = 2^{h-w}$,
    wherein $f_{THR}$ is a threshold value.

2. The method of claim 1, wherein $W > f_{THR} \cdot H$, and the DC value is determined by:

$$DC = \left(\left(\sum_{i=0}^{W-1} p_i\right) + (W \gg 1)\right) \gg w,$$

wherein DC denotes the DC value, W denotes the width of the current block, and $p_i$, i=0, ..., W−1 denote the reference samples only in the neighboring block on the top side of the current block.

3. The method of claim 1, wherein $H > f_{THR} \cdot W$, and the DC value is determined by:

$$DC = \left(\left(\sum_{i=0}^{H-1} p_i\right) + (H \gg 1)\right) \gg h,$$

wherein DC denotes the DC value, H denotes the height of the current block, and $p_i$, i=0, ..., H−1, denote the reference samples only in the neighboring block on the left side of the current block.

4. The method of claim 1, comprising determining the DC value of the current block based on a multiplication involving a weighting factor and reference samples of the current block in the picture.

5. The method of claim 4, wherein the weighting factor is proportional to an inverse of a sum of the aspect ratio of the current block and 1.

6. The method of claim 5, wherein the weighting factor equals $$\frac{1}{R_A + 1},$$

wherein $R_A$ is the aspect ratio.

7. The method of claim 5, wherein the weighting factor equals $$\frac{(1 \ll q)}{R_A + 1},$$

wherein $R_A$ is the aspect ratio, and q is an integer having a maximum possible value that does not cause an overflow of a data type used by the encoder.

8. The method of claim 4, wherein a value of the weighting factor is tabulated and stored in a look up table (LUT).

9. An encoder for DC intra prediction mode of a current block of a picture, comprising:
   one or more processors; and
   a non-transitory computer-readable storage medium coupled to the processors and storing programming for execution by the processors, wherein the programming, when executed by the processors, configures the encoder to carry out operations comprising:
   comparing a width of the current block with the height of the current block, wherein the current block is a coding unit (CU);
   when the width is greater than the height, determining a DC value of the current block based on reference samples only in a neighboring block on a top side of the current block; or when the height is greater than the width, determining a DC value of the current block based on reference samples only in a neighboring block on a left side of the current block; and
   outputting a bitstream that includes a sequence of bits indicating the DC intra prediction mode;
   wherein the width W of the current block is $W=2^w$ and the height H of the current block is $H=2^h$, h and w are integer numbers, and
   wherein:
   when $W > f_{THR} \cdot H$, an aspect ratio $R_A$ of the current block is $R_A = 2^{w-h}$; and
   when $H > f_{THR} \cdot W$, the aspect ratio $R_A$ of the current block is $R_A = 2^{h-w}$,
   wherein $f_{THR}$ is a threshold value.

10. The encoder of claim 9, wherein when $W > f_{THR} \cdot H$ the DC value is determined by:

$$DC = \left(\left(\sum_{i=0}^{W-1} p_i\right) + (W \gg 1)\right) \gg w,$$

wherein DC denotes the DC value, W denotes the width of the current block, and $p_i$, i=0, . . . , W−1, denote the reference samples only in the neighboring block on the top side of the current block.

11. The encoder of claim 9, wherein when $H > f_{THR} \cdot W$ the DC value is determined by:

$$DC = \left(\left(\sum_{i=0}^{H-1} p_i\right) + (H \gg 1)\right) \gg h,$$

wherein DC denotes the DC value, H denotes the height of the current block, and $p_i$, i=0, . . . , H−1, denote the reference samples only in the neighboring block on the left side of the current block.

12. The encoder of claim 9, wherein determining the DC value of the current block is based on a multiplication involving a weighting factor and reference samples of the current block in the picture.

13. The encoder of claim 12, wherein the weighting factor is proportional to an inverse of a sum of the aspect ratio of the current block and 1.

14. The encoder of claim 13, wherein the weighting factor equals $$\frac{1}{R_A + 1},$$

wherein $R_A$ is the aspect ratio.

15. The encoder of claim 13, wherein the weighting factor equals $$\frac{(1 \ll q)}{R_A + 1},$$

wherein $R_A$ is the aspect ratio, and q is an integer having a maximum possible value that does not cause an overflow of a data type used by the encoder.

16. The method of claim 12, wherein a value of the weighting factor is tabulated and stored in a look up table (LUT).

17. A non-transitory computer-readable media storing a bitstream that, when decoded by a decoding device, is used by the decoding device to generate a video wherein:
   the bitstream includes first information for a neighboring block of a current block, and second information indicating a DC intra prediction mode of the current block, wherein the current block is a coding unit (CU), and the current block can be reconstructed by the decoding device, using the bitstream, based on a DC value;
   when a width of the current block is greater than a height of the current block, the DC value of the current block is configured to be determined based on reference samples only in the neighboring block on a top side of the current block, or
   when the height is greater than the width, the DC value of the current block is configured to be determined based on reference samples only in the neighboring block on a left side of the current block;
   wherein the width W of the current block is $W=2^w$ and the height H of the current block is $H=2^h$, h and w are integer numbers, and
   wherein either:
   $W > f_{THR} \cdot H$, and an aspect ratio $R_A$ of the current block is $R_A = 2^{w-h}$; or
   $H > f_{THR} \cdot W$, and the aspect ratio $R_A$ of the current block is $R_A = 2^{h-w}$,
   wherein $f_{THR}$ is a threshold value.

* * * * *